May 18, 1948. J. R. DAILEY ET AL 2,441,619
WHEEL BALANCE WEIGHT
Filed Aug. 5, 1944 2 Sheets-Sheet 1
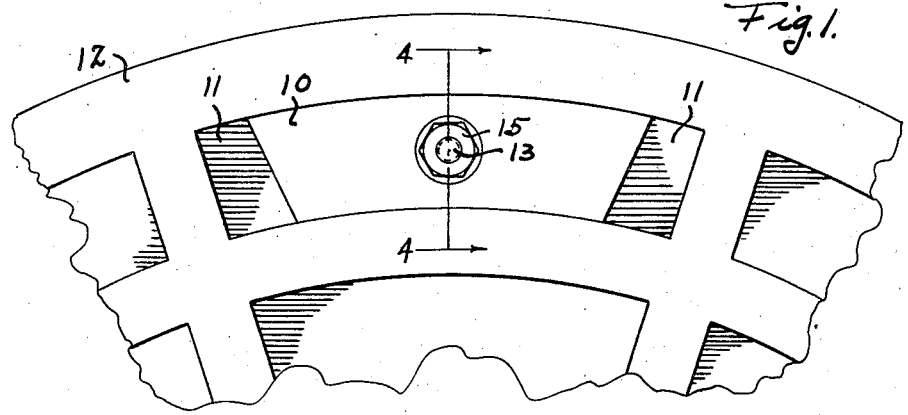
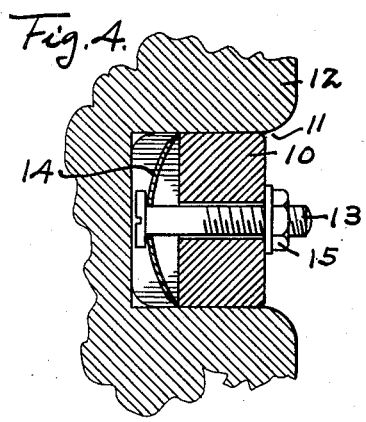
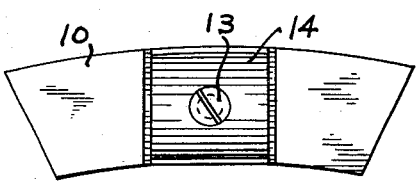
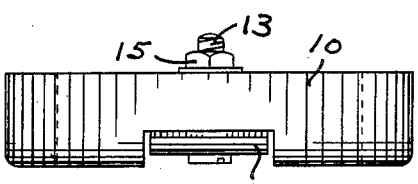
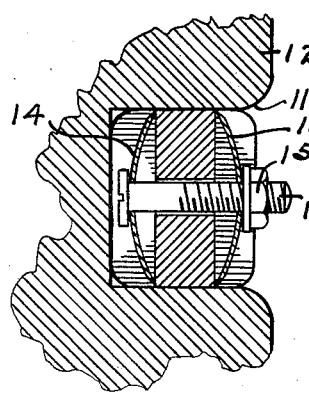
INVENTORS,
James Robert Dailey and
Henry C. Yeager,
By Herbert A. Minturn,
Attorney.

May 18, 1948.  J. R. DAILEY ET AL  2,441,619
WHEEL BALANCE WEIGHT
Filed Aug. 5, 1944  2 Sheets-Sheet 2
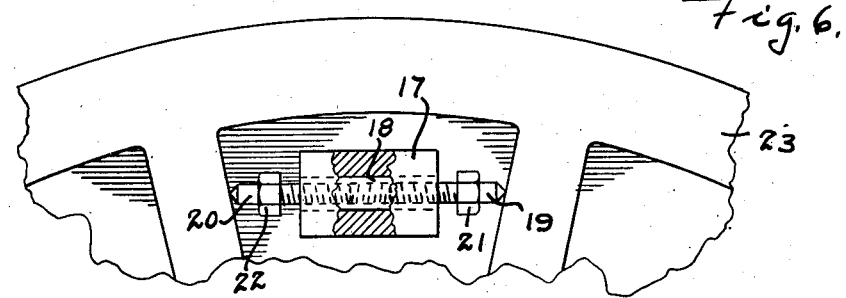
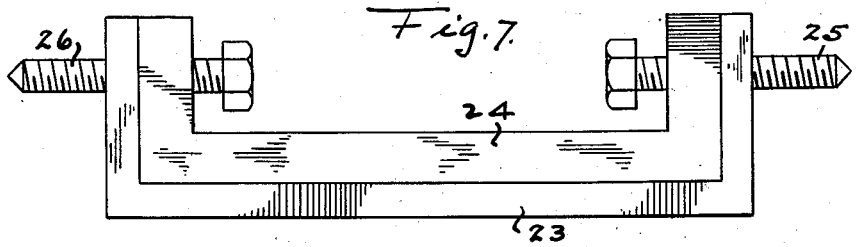
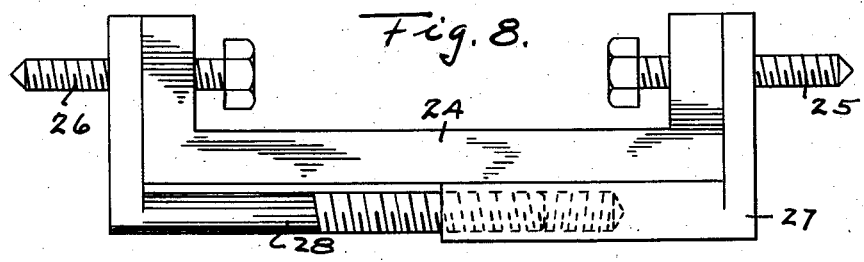
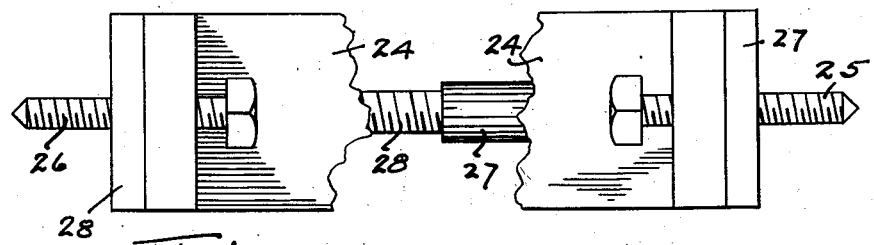
INVENTORS,
James Robert Dailey &
Henry C. Yeager,
By Herbert A. Minturn,
Attorney.

Patented May 18, 1948

2,441,619

UNITED STATES PATENT OFFICE 2,441,619

WHEEL BALANCE WEIGHT

James R. Dailey and Henry C. Yeager, Kokomo, Ind., assignors to Turner Manufacturing Company, Kokomo, Ind., a corporation of Indiana Application August 5, 1944, Serial No. 548,266

5 Claims. (Cl. 74—573)

This invention relates to balancing weights particularly adapted for balancing wheels where an outer rim portion thereof is not available as a location for mounting balancing weights. A primary object of the invention is to provide a balance weight structure which may be mounted over webs or in cavities between spaced apart shoulders or faces by expansion of abutting members from the weight proper tending to bite into those members and secure the weight in position. A further primary object of the invention is to provide a weight structure which will permit circumferential adjustment in respect to the wheel or member being balanced without having to employ any additional elements over and above those required to secure the weight in fixed position on the wheel.

These and many other objects and advantages of the invention will become apparent to those versed in the art in the following description as illustrated by the accompanying drawings, in which Fig. 1 is a view in side elevation of a balance weight structure applied to a member to be balanced;

Fig. 2, a view in rear elevation of the weight;

Fig. 3, a view in top plan;

Fig. 4, a view in vertical section on line 4—4 in Fig. 1;

Fig. 5, a similar view in section illustrating a modified form;

Fig. 6, a view in outside elevation of a further modified form of balance weight as applied to a rotating member;

Fig. 7, a side elevation of a balance weight in further modified form;

Fig. 8, a view in side elevation of a still further modified form of balance weight; and Fig. 9, a top plan view of that form shown in Fig. 8.

Like characters of reference indicate like parts throughout the several views in the drawings.

Referring first to that form of balance weight as shown in Figs. 1–4, a weight body 10 is formed in any desired configuration, preferably to fit within the confines of the space wherein the weight may be applied, such as in the well 11 on the wheel 12, the length of the body 10 being preferably less than that of the well 11 to permit longitudinal adjustment therein. The body 10 is provided with a bolt 13 passing therethrough. Between an abutment on the bolt 13, herein shown as the head of the bolt, and the body 10 is mounted an arcuate gripping member 14 having, preferably, sharpened edges at those ends of the body adjacent the top and bottom faces thereof.

This gripping member 14 in the form shown, consists of a length of spring steel which in its initial and normal position is bowed rearwardly from the body 10 to have its top and bottom edges terminate substantially at the top and bottom sides of the body 10 without projecting therebeyond. Further, the gripping member 14 is positioned against the back side of the body 10 to have its concave side toward the body so that when the bolt 13 is passed through the member 14 as indicated in Fig. 4, only the extreme upper and lower edges of the member 14 will be in contact with the body 10.

Preferably the rear side of the body 10 is cut away in the form of a notch thereacross sufficiently long to receive the gripping member 14 therein as well as the head of the bolt 13 so that the back face of the body 10 may be, if desired, placed in contact with the back face of the well 11.

To apply the balance weight as described, the weight of the body 10 is simply inserted within the well 11 with the gripping member 14 on the back side thereof. The body 10 will be made in different weights to meet the varying requirements for balancing, and therefore, the proper size weight will be selected in accordance with the condition of unbalance that is found to exist in respect to the wheel 12. Furthermore, the location of the weight to correct that unbalance will have been indicated by means well known to those versed in the art and not forming a part of the present invention.

The proper size body 10 will be put in that well 11 which is close to the location required to correct the unbalance of the wheel 12. The body 10 may be shifted circumferentially within the confines of the well 11 to reach the most effective position. To secure the body 10 in that position, some means is provided to pull the bolt 13 outwardly in respect to the body 10, such means being herein shown in the form of a nut 15. By running this nut 15 back on the bolt 13, the bolt 13 is relatively pulled outwardly through the body 10 to tend to straighten the gripping member 14 with the result that its top and bottom edges are forced against the top and bottom walls of the well 11. Any tendency to withdraw the weight 10 from that well will only cause the edges of the gripping member 14 to tend to bite further into the walls of the well. Since the member 14 is resilient, the pressure will continue to be applied yieldingly without any appreciable relaxation thereof, a factor of great importance particularly under vibratory conditions.

Under some extreme conditions, a second gripping member 16, Fig. 5, may be employed. This member 16 is a counterpart of the member 14 and is placed on the outer or forward side of the body 10, preferably within a recess formed thereacross. When the nut 15 is run back on the bolt 13 in this form, both gripping members 14 and 16 are tended to be flattened out to have four edges biting into the opposing walls of the well 11, the edges of the front gripping member 16 engaging the well walls at angles tending to oppose the angle of contacts by the corresponding edges of the gripping member 14 in respect to tendency to shift the entire body 10.

Referring to that form of the invention as illustrated in Fig. 6, a weight body 17 of any heavy metal, such as lead, as would also be employed in respect to the weight body 10, carries a central longitudinal, threaded bore therethrough. Preferably this bore is within an inserted tube 18 of a harder metal or material than that of the lead in weight body 17. Studs 19 and 20 are screw-threadedly engaged in opposite ends of the bore and carry some gripping means, such as hexagon collars 21 and 22 as means for turning the studs in respect to the weight body 17. Each of the studs 19 and 20 is provided with an outer engaging end, herein shown as pointed. By relatively extending the studs 19 and 20 from the weight body 17, the pointed ends thereof may be brought into engagement with opposing faces found on the member 23 which is to be balanced. This type of weight as shown in Fig. 6 is particularly useful wherein there is no readily opposing faces between which the weight of the form shown in Figs. 1-5 may be mounted. Of course, the form shown in Fig. 6 may be utilized between readily opposing faces simply by aligning the studs 19 and 20 on a radius of the member 23. Furthermore, this particular form of weight body 17 may be shifted circumferentially in respect to the member 23 by reducing the length of extension of the stud 19, for example, in respect to the extension of the stud 20 from the weight body 17. In other words, the weight body 17 may be shifted relatively along those two studs to secure the optimum position. Referring to the form of the invention as illustrated in Fig. 7, a yoke 23, preferably made out of some relatively rigid metal carries a weight body 24 therein between the legs of the yoke. This weight body 24 may be varied in thickness and made of any heavy metal, such as lead as desirable to obtain the total over-all weight required. In other words, variation in sizes of the weight may be obtained by interchanging different sizes of weight bodies 24. The body 24 is secured to the yoke 23 by means of the mounting screws 25 and 26 respectively which screw-threadedly pass through out-turned legs of the weight body 24 and the mounting yoke 23 to have their pointed ends engage opposing faces found on the member to be balanced. Obviously the yoke 23 and body 24 may be made in one piece particularly if antimony is mixed in the lead to give sufficient rigidity.

The form of the invention shown in Figs. 8 and 9 differs only from that shown in Fig. 7 by the construction of the yoke. Where it may be desired to use weight bodies 24 of different lengths the yoke may be made in two parts to be extensible and contractible to accommodate those varying lengths of the bodies. Thus one end 27 of the yoke may be screw-threaded to receive a threaded bolt end 28 of the other end of the yoke to secure this adjustment.

The forms of the invention shown in Figs. 7 and 8 may be employed to engage over webs simply by reversing the positions of the screws 25 and 26 to have their heads outside and the pointed ends inside the legs of the weights. Also, the weights in all the forms shown may be employed in any cavity or well found in the rotating member even extending transversely across or longitudinally of the member.

While the invention has herein been shown and described in more or less minute detail in reference to the various forms, it is obvious that the structural members may be varied some without departing from the spirit of the invention, and it is, therefore, desired that the invention not be limited to such precise showing beyond the limitations as may be imposed by the following claims.

We claim:

1. A balance weight comprising a body, and a pair of members screw-threadedly carried thereby having pointed ends directed oppositely and outwardly one from the other.

2. A balance weight comprising a body, and a pair of members screw-threadedly carried thereby having pointed ends directed oppositely and outwardly one from the other; said body being U-shaped, and said screw-threaded members being carried by the legs of the body.

3. A balance weight comprising a body; a pair of body mounting members screw-threadedly carried by the body to have mounting ends directed oppositely and outwardly one from the other; legs carried by said body through which said screw members engage; and a weight member carried by the body between said legs.

4. A balance weight comprising a body; a pair of body mounting members screw-threadedly carried by the body to have mounting ends oppositely directed; legs carried by said body through which said screw members engage; and a weight member carried by the body between said legs; said screw members also passing through said weight member.

5. A balance weight comprising a body; a pair of body mounting members screw-threadedly carried by the body to have mounting ends directed oppositely and outwardly one from the other; legs carried by said body through which said screw members engage; and a weight member carried by the body between said legs; and means for varying the length of said body.

JAMES R. DAILEY.
HENRY C. YEAGER.

REFERENCES CITED

The following references are of record in the file of this patent:

UNITED STATES PATENTS

| Number | Name | Date |
| --- | --- | --- |
| 340,968 | Levering | Apr. 27, 1866 |
| 601,998 | Currier | Apr. 5, 1898 |
| 1,429,211 | Lightburn | Sept. 12, 1922 |
| 1,438,768 | Lapham | Dec. 12, 1922 |
| 1,616,100 | Yount | Feb. 1, 1927 |
| 1,722,096 | Keim | July 23, 1929 |
| 2,262,535 | Hogaboom | Nov. 11, 1941 |
| 2,316,389 | Atkinson | Apr. 13, 1943 |